(12) United States Patent
Kim (10) Patent No.: US 11,596,256 B1
(45) Date of Patent: Mar. 7, 2023

(54) FRUIT AND VEGETABLE PEELER AND CARVING TOOL

(71) Applicant: Sun Yong Kim, Hayward, CA (US)

(72) Inventor: Sun Yong Kim, Hayward, CA (US)

(*) Notice: Subject to any disclaimer, the term of this patent is extended or adjusted under 35 U.S.C. 154(b) by 0 days.

(21) Appl. No.: 17/963,931

(22) Filed: Oct. 11, 2022

(51) Int. Cl.
*A47J 17/02* (2006.01)
*B26B 27/00* (2006.01)

(52) U.S. Cl.
CPC ............... *A47J 17/02* (2013.01); *B26B 27/00* (2013.01)

(58) Field of Classification Search
None
See application file for complete search history.

(56) References Cited

U.S. PATENT DOCUMENTS

| | | | | |
|---|---|---|---|---|
| 2,010,414 A | * | 8/1935 | Rekonty | A47J 17/02 30/123.5 |
| 3,169,316 A | * | 2/1965 | Johnston | A47J 17/02 30/279.6 |
| 4,656,936 A | * | 4/1987 | Bardon | A47J 17/18 99/623 |
| 9,743,793 B1 | * | 8/2017 | Soran | A47J 17/04 |
| 2015/0075007 A1 | * | 3/2015 | Vitenson | B26D 3/283 30/142 |

FOREIGN PATENT DOCUMENTS

| | | | |
|---|---|---|---|
| DE | 41 38 135 A1 | * | 5/1993 |
| DE | 20 2005 002 865 U1 | * | 6/2005 |

* cited by examiner

*Primary Examiner* — Hwei-Siu C Payer
(74) *Attorney, Agent, or Firm* — Gerald R. Prettyman (57) ABSTRACT

A fruit and vegetable peeler and carving tool has a handle with a first side and second side extension extending from the front of the handle. Each side extension has a forward lever which is positionably affixed at a forward vertical plurality of lever affixment position, and a rear lever which is positionably affixed at a rear horizontal plurality of lever affixment position. The forward lever and the rear lever of each side are connected together in parallel with a depth adjustment rod is connected between them. A triangular handle-facing fruit and vegetable peeling and carving blade has a convex upper surface and a concave lower surface. By drawing the fruit and vegetable peeler and carving tool into a fruit or vegetable, the triangular handle-facing fruit and vegetable peeling and carving blade cuts into the fruit or vegetable to a depth controlled by the position of the depth adjustment rod.

12 Claims, 8 Drawing Sheets

FRUIT AND VEGETABLE PEELER AND CARVING TOOL

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

Field of Invention

The invention relates generally to the field of peeling and carving of fruits and vegetables, and more specifically to devices for hand peeling and carving of larger fruits and vegetables such as mangos, watermelons, and pineapple.

Description of Related Art

Fruit and vegetable peeling and carving tools exist in three varieties knives, peelers, and variations such as coring devices, and variations of wood-working tools for artistic work such as chisels and scrapers. None of these, however, are well-suitable for peeling or carving tough or thick-skinned fruits or vegetables such as a mangos, pineapples or watermelon.

SUMMARY OF THE INVENTION

Embodiments are directed to a fruit and vegetable peeler and carving tool (100).

A handle (105) has a handle top side (110), a handle bottom side (115), a handle front end (120), a handle back end (125), a handle first side (130A), and a handle second side (130B).

Extending parallel with the handle first side (130A) is a first side extension (135A) having a first side extension top end (140A), a first side extension bottom edge (150A), and a first side extension forward edge (155A).

Extending parallel with the handle second side (130B) is a second side extension (135B) having a second side extension top end (140B), a second side extension bottom edge (150B), and a second side extension forward edge (1551B).

Extending from first side extension (135A) is a first side extension blade (160A) extending from first side extension (135A) to a midline (185) between the first side extension (135A) and the second side extension (135B) and creating an obtuse angle (A) between the first side extension (135A) and the midline (185) between the first side extension (135A) and the second side extension (135B).

Extending from second side extension (135B) is a second side extension blade (160B) extending from the second side extension to the midline (185) between the first side extension (135A) and the second side extension (135B) and creating an obtuse angle (A) between the second side extension (135B) and the midline (185) between the first side extension (135A) and the second side extension (135B).

The first side extension blade (160A) and the second side extension blade (160B) converge into a handle-facing fruit and vegetable peeling and carving blade (215) comprising a convex blade upper side (205) and a concave blade lower side (210).

An adjustable peeling and carving depth setting device (220) has a forward adjustable lever first side (225A) which is independently adjustably affixed at an upper end to a plurality of vertical linear affixment first side (270A) of the first side extension (135A), a rear adjustable lever first side (235A) which is independently adjustably affixed at an upper end to a plurality of horizontal linear affixment first side (275A) of the first side extension (135A), a forward adjustable lever second side (225B) which is independently adjustably affixed at an upper end to a plurality of vertical linear affixment second side (270B) of the second side extension (135B), and a rear adjustable lever second side (235B) which is independently adjustably affixed at an upper end to a plurality of horizontal linear affixment second side (275B) of the second side extension (135B).

The forward adjustable lever first side (225A) is connected at a lower end to a lower end of the rear adjustable lever first side (235A) at a first side of a depth adjustment rod (265), and the forward adjustable lever second side (225B) is connected at a lower end to a lower end of the rear adjustable lever second side (235B) at a second side of the depth adjustment rod (265)

The depth adjustment rod (265) may be vertically adjusted with respect to the handle-facing fruit and vegetable peeling and carving blade (215) as to vertically control the peeling and carving depth (H) of the fruit and vegetable peeler and carving tool (100) in increments of at least one-sixteenth inch.

Independent positioning of the forward adjustable lever first side (225A) and the rear adjustable lever first side (235A) to the first side extension (135A), and of the forward adjustable lever second side (225B) and the rear adjustable lever second side (235B) to the second side extension (135B) provide for a large range of vertical positioning adjustment of the depth adjustment rod (265) to a depth "H" with respect to the triangular handle-facing fruit and vegetable peeling and carving blade (215). Compare FIGS. 4A and 4B.

If the depth "H" of the depth adjustment rod (265) is set relative to a thickness of a particular fruit or vegetable, the triangular handle-facing fruit and vegetable peeling and carving blade (215) may be used to remove the easily remove the skin of a mango, rind of a watermelon, or shell/skin of a pineapple for use of the whole of the fruit or vegetable.

The depth "H" of the depth adjustment rod (265) may then be set to a depth to allow use of the fruit and vegetable peeler and carving tool to be pulled through a fruit or vegetable to create slices having a consistent thickness, and to avoid cutting into the core or seed.

The plurality of horizontal linear affixment first side (275A) and of the plurality of horizontal linear affixment second side (275B) may be a discrete plurality of horizontal linear affixment (275C and 275D).

The plurality of horizontal linear affixment first side (275A) and of the plurality of horizontal linear affixment second side (275B) may be a continuous plurality of horizontal linear affixment (220B).

DETAILED DESCRIPTION OF THE INVENTION

Figure 1A:
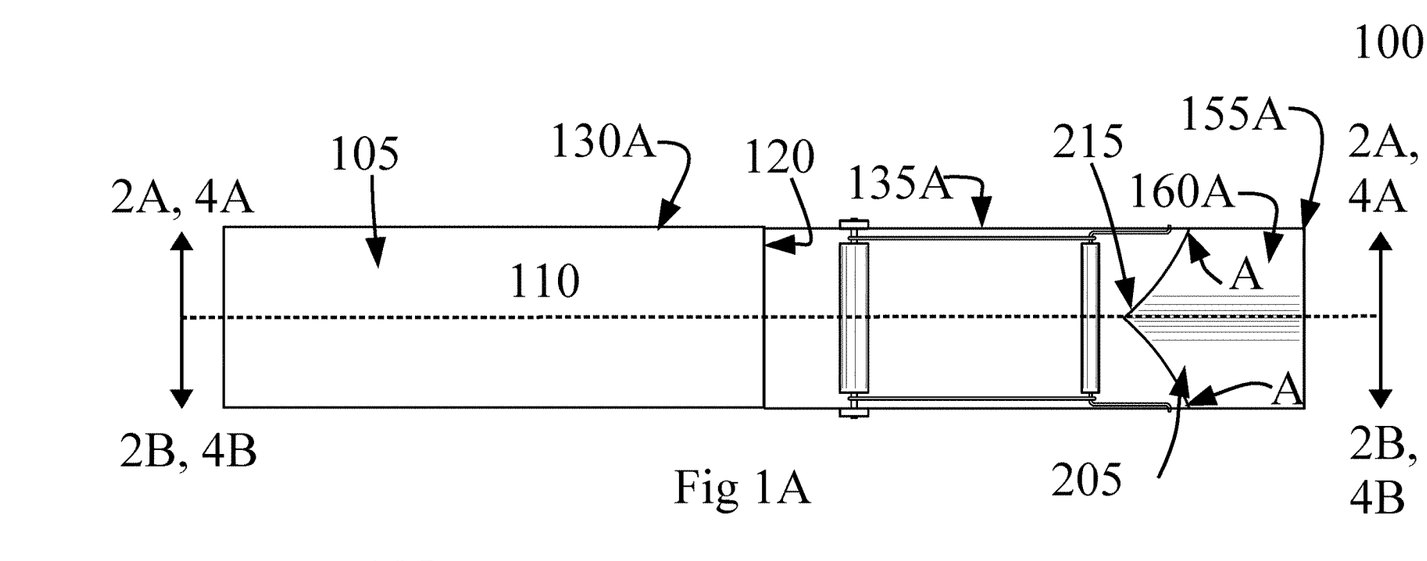
FIGS. 1A and 1B show a top view and a bottom respectively of the fruit and vegetable peeler and carving tool (100).
Figure 1B:
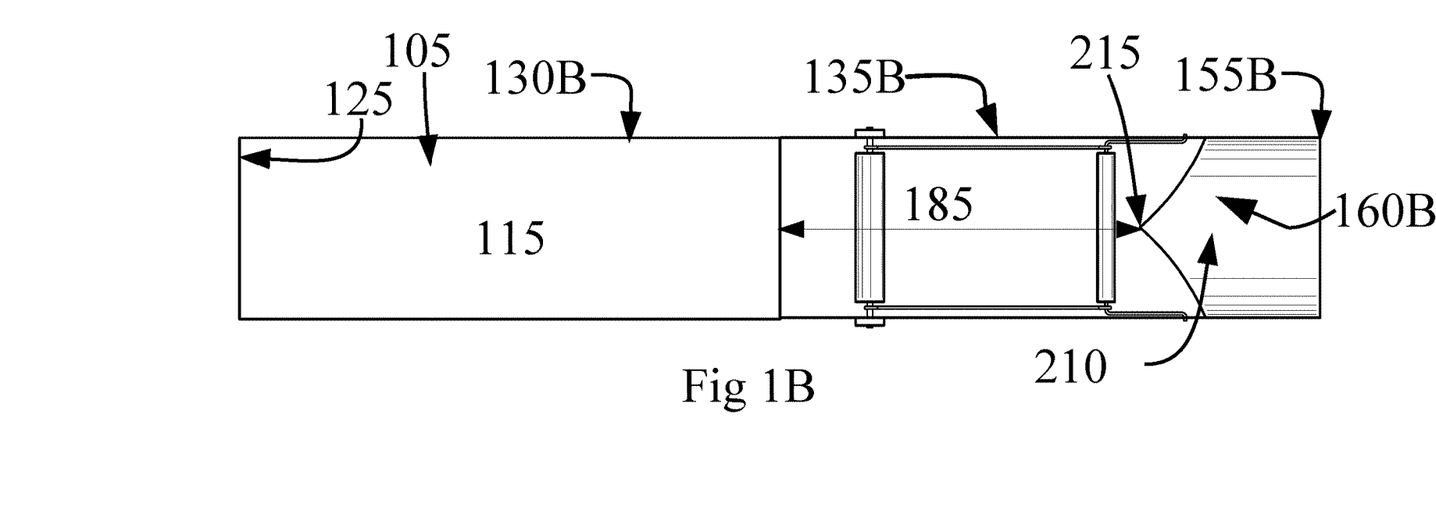

FIGS. 1A and 1B shows a top view and a bottom respectively of the fruit and vegetable peeler and carving tool.

Shown in FIGS. 1A and 1B are a handle (105), a handle top side (110), a handle bottom side (115), a handle front end (120), a handle back end (125), a handle first side (130A), and a handle second side (130B).

Also shown in FIG. 1A are a first side extension (135A) parallel to the handle first side (130A), and a first side extension forward edge (155A). Also shown in FIG. 1A is a first side extension blade (160A) which along with a second side extension blade (160B, FIG. 1B) forms a handle-facing fruit and vegetable peeling and carving blade (215).

Also shown in FIG. 1B are a second side extension (135B) parallel to the handle second side (130B), a second side extension forward edge (155B), and a midline (185) between the first side extension (135A) and the second side extension (135B), along with the first side extension blade (160A, FIG. 1A) form the handle-facing fruit and vegetable peeling and carving blade (215)

Also shown in FIG. 1A is an angle A formed between the first side extension blade (160A) and the first side extension (135A), and a counterpart angle A formed between the second side extension blade (160B) and the second side extension (135B).

The handle (105) serves as a grasping and handling device for use of the fruit and vegetable peeler and carving tool (100). The handle (105) may be made of wood, plastic, ceramic, metal, a composite of one or more of these materials, or made of any material suitable for functioning as a handle. The handle (105) may solid, hollow, cylindrical, oval, or any shape suitable for functioning as a handle. The handle (105) may be covered with a material to improve gripping, i.e., rubber, plastic, ribbing or any material, or covered with a material suitable for functioning as a handle. The handle (105) may be smooth, roughened, textured, undulated, or otherwise surfaced for functioning as a handle.

The first side extension (135A), the first side extension forward edge (155A), the second side extension (135B), and the second side extension forward edge (155B) serve to extend the handle-facing fruit and vegetable peeling and carving blade (215) away from the handle (105). The first side extension (135A) and second side extension (135B) provide (1) a gap between the handle (105) and the handle-facing fruit and vegetable peeling and carving blade (215) for a user to see the fruit or vegetable being cut and thereby align the handle-facing fruit and vegetable peeling and carving blade (215) along the fruit or vegetable being cut, and (2) provide spacing for adjusting a depth adjustment rod (265) (described below).

A longer viewable path can be appreciated for larger fruits and vegetables such as mangos, watermelons, and pineapples. Integrating the handle-facing fruit and vegetable peeling and carving blade (215) with the first side extension blade (160A) and the second side extension blade (160B) assure a sturdy support mechanism as the handle-facing fruit and vegetable peeling and carving blade (215) is pulled though the fruit or vegetable.

These components are best made of a metal, such as iron, steel or aluminum to provide strength for peeling and carving fruits and vegetables which have thicker or tougher skins or shells. Other materials such as plastic could be used, as for fruits and vegetables of thinner or non-fibrous skins, or with a thicker or reinforced blade, or with metal blade inserts at the handle-facing fruit and vegetable peeling and carving blade (215) and thicker first side extension blade (160A) and second side extension blade (160B).

Figure 2A:
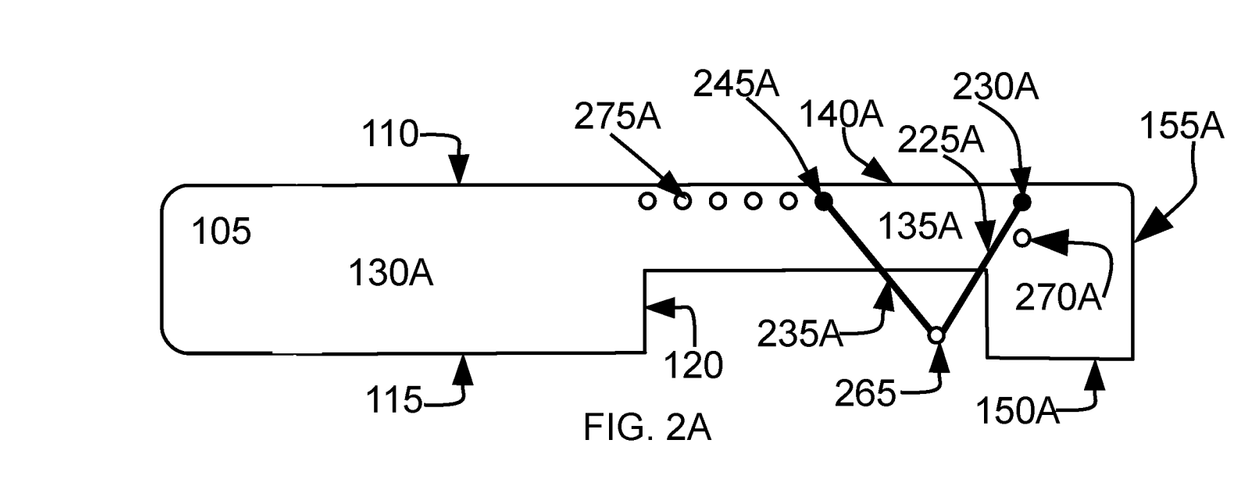
FIG. 2A shows a first side section view of the fruit and vegetable peeler and carving tool showing the first side as seen from the second side to show the first side forward lever, the first side rear lever, and associated structures forming an adjustable peeling and carving depth setting device (220).

FIG. 2A shows a first side section view of the fruit and vegetable peeler and carving tool showing the first side as seen from the second side to show the first side forward lever, the first side rear lever, and associated structures.

Figure 2B:
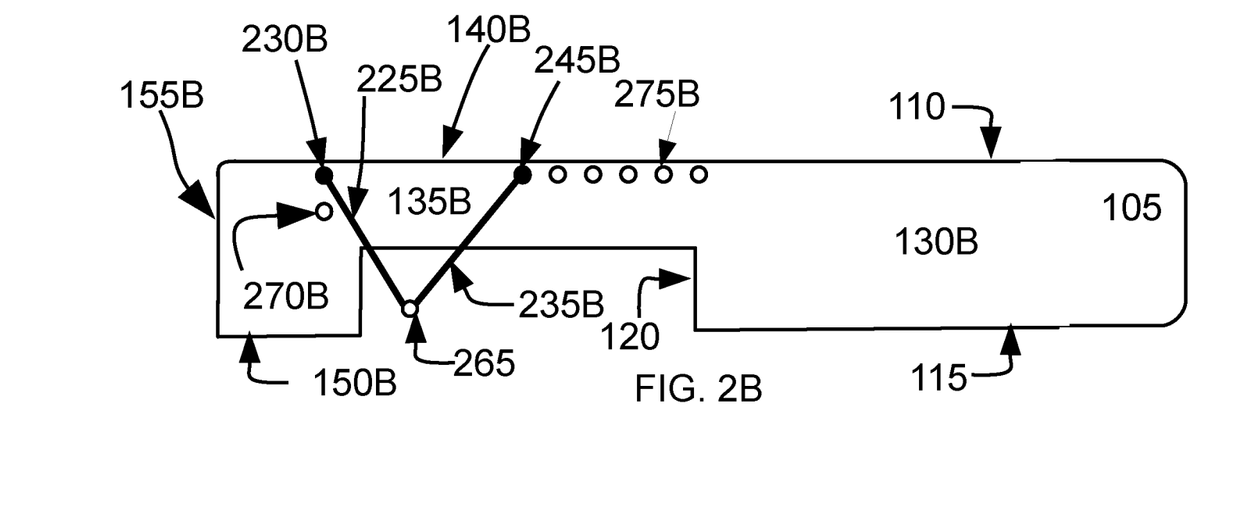
FIG. 2B shows a second side section view of the fruit and vegetable peeler and carving tool showing the second side as seen from the first side to show the second side forward lever, the second side rear lever, and associated structures forming an adjustable peeling and carving depth setting device (220).

FIG. 2B shows a second side section view of the fruit and vegetable peeler and carving tool showing the second side as seen from the first side to show the second side forward lever, the second side rear adjustable lever, and associated structures.

Shown in FIG. 2A are the handle (105), the handle top side (110), a handle bottom side (115), the handle first side (130A), the first side extension (135A), the first side extension top end (140A), the first side extension bottom edge (150A), and the first side extension forward edge (155A).

Also shown in FIG. 2A is a collective portion of an adjustable peeling and carving depth setting device (220) having a forward adjustable lever first side (225A), a forward adjustable lever first side connector (230A), a rear adjustable lever first side (235A), a rear adjustable lever first side connector (245A), a depth adjustment rod (265), a plurality of vertical linear affixment first side (270A), and an embodiment of a plurality of horizontal linear affixment first side (275A) in an embodiment of a discrete plurality of horizontal linear affixment (275C and 275D).

Shown in FIG. 2B are the handle (105), the handle top side (110), a handle bottom side (115), the handle second side (130B), the second side extension (135B), the second side extension top end (140B), the second side extension bottom edge (150B), and the second side extension forward edge (155B).

Also shown in FIG. 2B is a collective portion of an adjustable peeling and carving depth setting device (220) having a forward adjustable lever second side (225B), a forward adjustable lever second side connector (230B), a rear adjustable lever second side (235B), a rear adjustable lever second side connector (245B), and a depth adjustment rod (265), a plurality of vertical linear affixment second side (270B), and a plurality of horizontal linear affixment second side (275B).

The forward adjustable lever first side (225A), the forward adjustable lever first side connector (230A), the rear adjustable lever first side (235A) and the rear adjustable lever first side connector (245A), along with the plurality of vertical linear affixment first side (270A) and the plurality of horizontal linear affixment first side (275A), along with the coordinate second side structures, allow for adjustment of the depth adjustment rod (265) to control a peeling and carving depth (H) of the fruit and vegetable peeler and carving tool (100). (See FIGS. 4A and 4B.)

The forward adjustable lever first side (225A), the forward adjustable lever first side connector (230A), the rear adjustable lever first side (235A) and the rear adjustable lever first side connector (245A), along with the plurality of vertical linear affixment first side (270A) and the plurality of horizontal linear affixment first side (275A), along with the coordinate second side structures are used for adjustment of the depth adjustment rod (265) to vertically control the peeling and carving depth (H) of the fruit and vegetable peeler and carving tool (100).

The forward adjustable lever first side (225A) is adjustably affixed at an upper end to the plurality of vertical linear affixment first side (270A). A forward adjustable lever first side connector (230A) may affix the forward adjustable lever first side (225A) to the plurality of vertical linear affixment first side (270A).

The forward adjustable lever first side (225A) is connected at a lower end to a lower end of the rear adjustable lever first side (235A) at a first side of a depth adjustment rod (265). The forward adjustable lever first side (225A) and the rear adjustable lever first side (235A) are independently positionable.

The rear adjustable lever first side (235A) is adjustably affixed at an upper end to the plurality of horizontal linear affixment first side (275A). A rear adjustable lever first side connector (245A) may affix the rear adjustable lever first side (235A) to a plurality of horizontal linear affixment first side (275A).

The forward adjustable lever first side (225A) and the rear adjustable lever first side (235A) may be made of metal, plastic, composite, wood, or of any material suitable for manufacture or for use as levers for adjustment of the depth adjustment rod (265) to control the peeling and carving depth (H) of the fruit and vegetable peeler and carving tool (100).

Positional adjustment of the forward adjustable lever first side (225A) or of the rear adjustable lever first side (235A), or both, may be accomplished by removal of the related connector, i.e., the forward adjustable lever first side connector (230A) or the rear adjustable lever first side connector (245A), repositioning of the desired lever, i.e., forward adjustable lever first side (225A) or the rear adjustable lever first side (235A), and reattachment of the related connector.

The depth adjustment rod (265) may be adjusted in increments of at least one-sixteenth inch to adjust the peeling and carving depth (H) in increments of at least one-sixteenth inch.

Note that a positional adjustment of the forward adjustable levers first side and second side (225A and 225B) or of the rear adjustable levers first side and second side (235A and 235B) of one side mandates an equivalent repositioning of the opposite side.

The forward adjustable lever second side (225B), the forward adjustable lever second side connector (230B), the rear adjustable lever second side (235B) and the rear adjustable lever second side connector (245B), along with the plurality of vertical linear affixment second side (270B) and the plurality of horizontal linear affixment second side (275B), along with the coordinate first side structures are used for adjustment of the depth adjustment rod (265) to control the peeling and carving depth (H) of the fruit and vegetable peeler and carving tool (100).

The forward adjustable lever second side (225B) is adjustably affixed at an upper end to the plurality of vertical linear affixment second side (270B). A forward adjustable lever second side connector (230B) may affix the forward adjustable lever second side (225B) to the plurality of vertical linear affixment second side (270B).

The forward adjustable lever second side (225B) is connected at a lower end to a lower end of the rear adjustable lever second side (235B) at a second side of the depth adjustment rod (265). The forward adjustable lever second side (225B) and the rear adjustable lever second side (235B) are independently positionable.

The rear adjustable lever second side (235B) is adjustably affixed at an upper end to the plurality of horizontal linear affixment second side (275B). A rear adjustable lever second side connector (245B) may affix the rear adjustable lever second side (235B) to a plurality of horizontal linear affixment second side (275B).

The forward adjustable lever second side (225B) and the rear adjustable lever second side (235B) may be made of metal, plastic, composite, wood, or of any material suitable for manufacture or for use as levers for adjustment of the depth adjustment rod (265) to control the peeling and carving depth (H) of the fruit and vegetable peeler and carving tool (100).

Figure 3A:
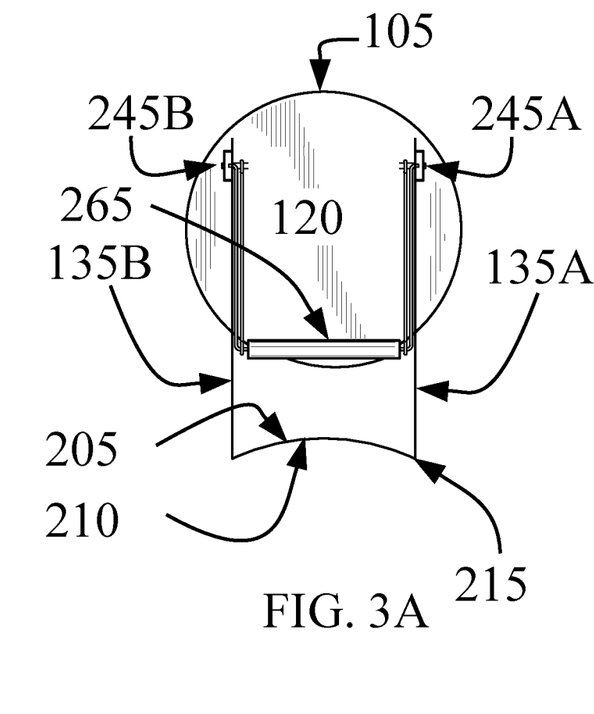
FIGS. 3A and 3B show a front view and a back view respectively of the fruit and vegetable peeler and carving tool (100) to show a handle-facing fruit and vegetable peeling and carving blade (215) having a convex blade upper side (205) and a concave blade lower side (210).
Figure 3B:
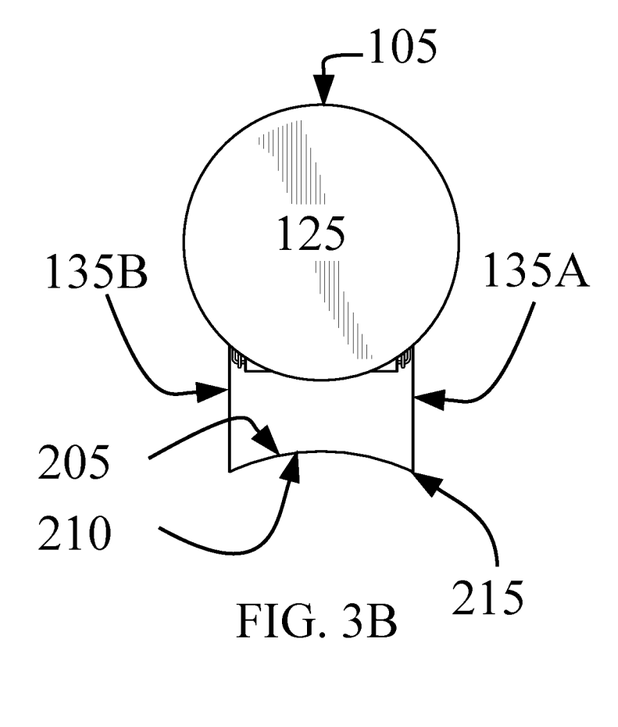

FIGS. 3A and 3B show a front view and a back view respectively of the fruit and vegetable peeler and carving tool (100) showing the convex blade upper side (205) and the concave blade lower side (210) and a depth adjustment rod (265).

Shown in FIG. 3A are the handle front end (120) of the handle (105), the first side extension (135A), and the second side extension (135B). Also shown in FIG. 3A are the convex blade upper side (205), and the concave blade lower side (210) that form the handle-facing fruit and vegetable peeling and carving blade (215) as well as a depth adjustment rod (265) between the first side extension (135A) and the second side extension (135B).

The convex blade upper side (205) and the concave blade lower side (210) are formed equally from the first side extension blade (160A) and the second side extension blade (160B).

The first side extension blade (160A) is affixed along a forward bottom of the first side extension (135A) from the first side extension forward edge (155A) at the front of the first side extension blade (160A) and extends back towards the handle and towards the second side extension (135B) to join with a coordinate blade of the second side extension (135B) at the midline (185) between the first side extension (135A) and the second side extension (135B).

Similarly, the second side extension blade (160B) is affixed along a forward bottom of the second side extension (135B) from the second side extension forward edge (155B) at the front of the second side extension blade (160B) and extends back towards the handle and towards the first side extension (135A) to join with a coordinate blade of the first side extension (135A) at the midline (185) between the first side extension (135A) and the second side extension (135B).

The first side extension blade (160A) and the second side extension blade (160B) form a handle-facing fruit and vegetable peeling and carving blade (215) (shown in FIGS. 1A, 1B, and 5) for peeling and carving fruits and vegetables.

The first side extension blade (160A) may form an obtuse angle (A) with respect to the first side extension (135A) between the first side extension (135A) and the midline (185) between the first side extension (135A) and the second side extension (135B).

The second side extension blade (160B) may form an obtuse angle (A) with respect to the second side extension (135B) between the second side extension (135B) and the midline (185) between the first side extension (135A) and the second side extension (135B).

The obtuse angle (A) may be greater than 90 degrees but less than 120 degrees. The obtuse angle (A) may be between 120 degrees and 150 degrees. The obtuse angle (A) may be greater than 150 degrees.

The first side extension blade (160A) and the second side extension blade (160B) may be made of metal, plastic, composite, wood, or of any material suitable for functioning as a fruit and vegetable peeling and carving blade (215) for peeling and carving fruits and vegetables. In some embodiments, the first side extension blade (160A) and the second side extension blade (160B) may have a convex blade upper side (205), and a concave blade lower side (210).

In some embodiments, the first side extension blade (160A) and the second side extension blade (160B) may have a geometric configuration, i.e., that of a square, a rectangular, a parallelogram, a trapezoid, etc.

Figure 4A:
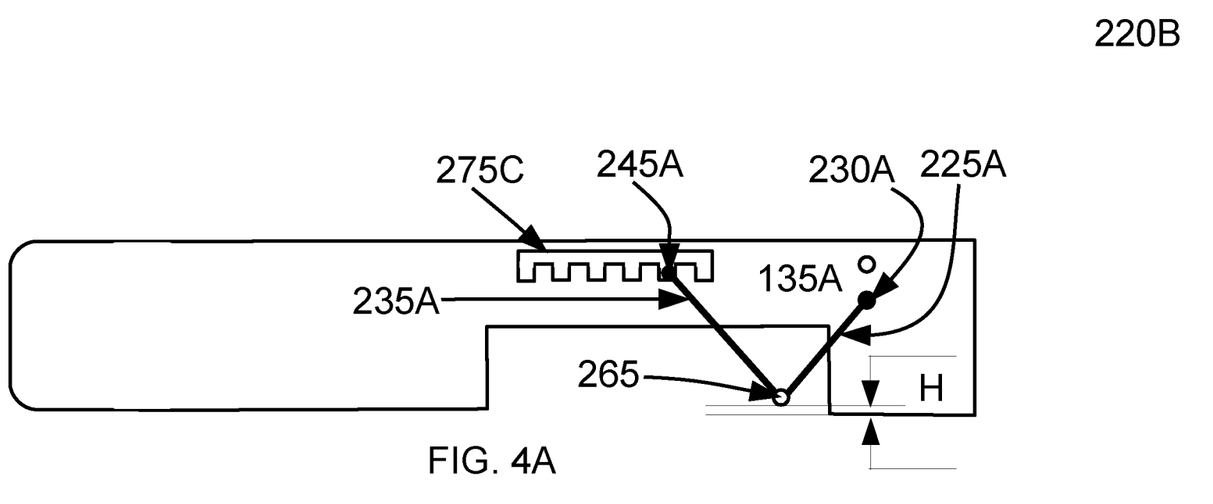
FIG. 4A shows a section view of the fruit and vegetable peeler and carving tool showing the first side as seen from the second side and showing (1) a second embodiment of the adjustable peeling and carving depth setting device (220) showing of a continuous plurality of horizontal linear affixment (220B) having a continuous plurality of horizontal linear affixment first side (275C), and (2) a comparative positional adjustments of the forward adjustable lever first side (225A) and the rear adjustable lever first side (235A) to different positions to show a different peeling and carving depth (H) from FIG. 4A and FIG. 4B.
Figure 4B:
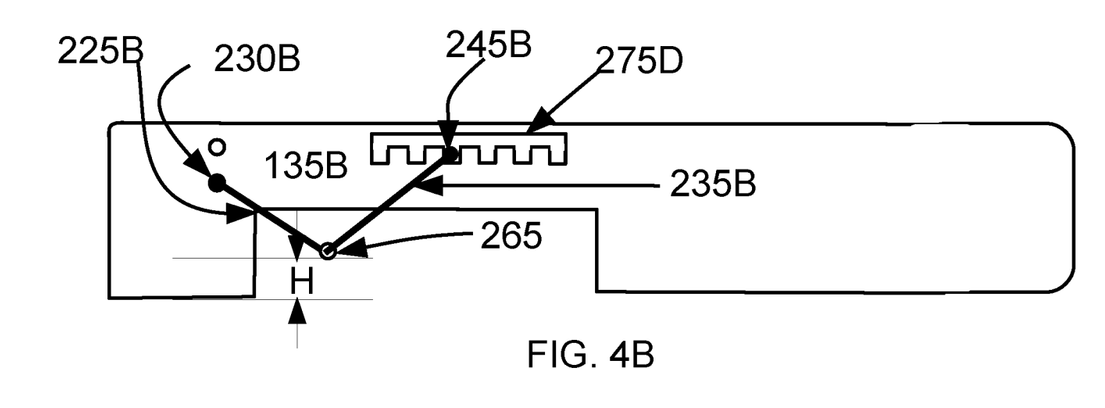
FIG. 4B shows a section view of the fruit and vegetable peeler and carving tool showing the first side as seen from the second side and showing (1) a second embodiment showing of a continuous plurality of horizontal linear affixment (220B) having a continuous plurality of horizontal linear affixment second side (275B), and (2) positional adjustments of the forward adjustable lever second side (225B) and the rear adjustable lever second side (235B) to different positions to show a different peeling and carving depth (11) from FIG. 4B.

FIG. 4A shows a section view of the fruit and vegetable peeler and carving tool showing the first side as seen from the second side and showing (1) an alternate embodiment of the adjustable peeling and carving depth setting device (220) showing of a continuous plurality of horizontal linear affixment first side (275C), and (2) a comparative positional adjustment of the forward adjustable lever first side (225A) and the rear adjustable lever first side (235A) to different positions to show a different peeling and carving depth (H) from FIG. 4B.

FIG. 4B shows a section view of the fruit and vegetable peeler and carving tool showing the second side as seen from the first side and showing (1) an alternate embodiment of the adjustable peeling and carving depth setting device (220) showing of a continuous plurality of horizontal linear affixment second side (275D), and (2) a comparative positional adjustment of the forward adjustable lever second side (225B) and the rear adjustable lever second side (235B) to different positions to show a different peeling and carving depth (H) from FIG. 4A.

As compared to FIGS. 2A and 2B, FIG. 4A and FIG. 4B show an alternate embodiment having a continuous plurality of horizontal linear affixment first side (275C) and a continuous plurality of horizontal linear affixment second side (275D) instead of a discrete plurality of horizontal linear affixment first side (275A) and a discrete plurality of horizontal linear affixment second side (275B). This alternate embodiment allows adjustment of the rear adjustable lever first side (235A) and the rear adjustable lever second side (235B) with a sliding movement of the upper end of the rear adjustable lever first side (235A) and the upper end of the rear adjustable lever second side (235B) respectively.

A forward adjustable lever first side connector (230A) may affix the forward adjustable lever first side (225A) to the plurality of vertical linear affixment first side (270A) while a rear adjustable lever first side connector (245A) may affix the rear adjustable lever first side (235A) to the first side extension (135A).

A forward adjustable lever second side connector (230B) may affix the forward adjustable lever second side (225B) to the plurality of vertical linear affixment second side (270B) while a rear adjustable lever second side connector (245B) may affix the rear adjustable lever second side (235B) to the second side extension (135B).

Figure 5:
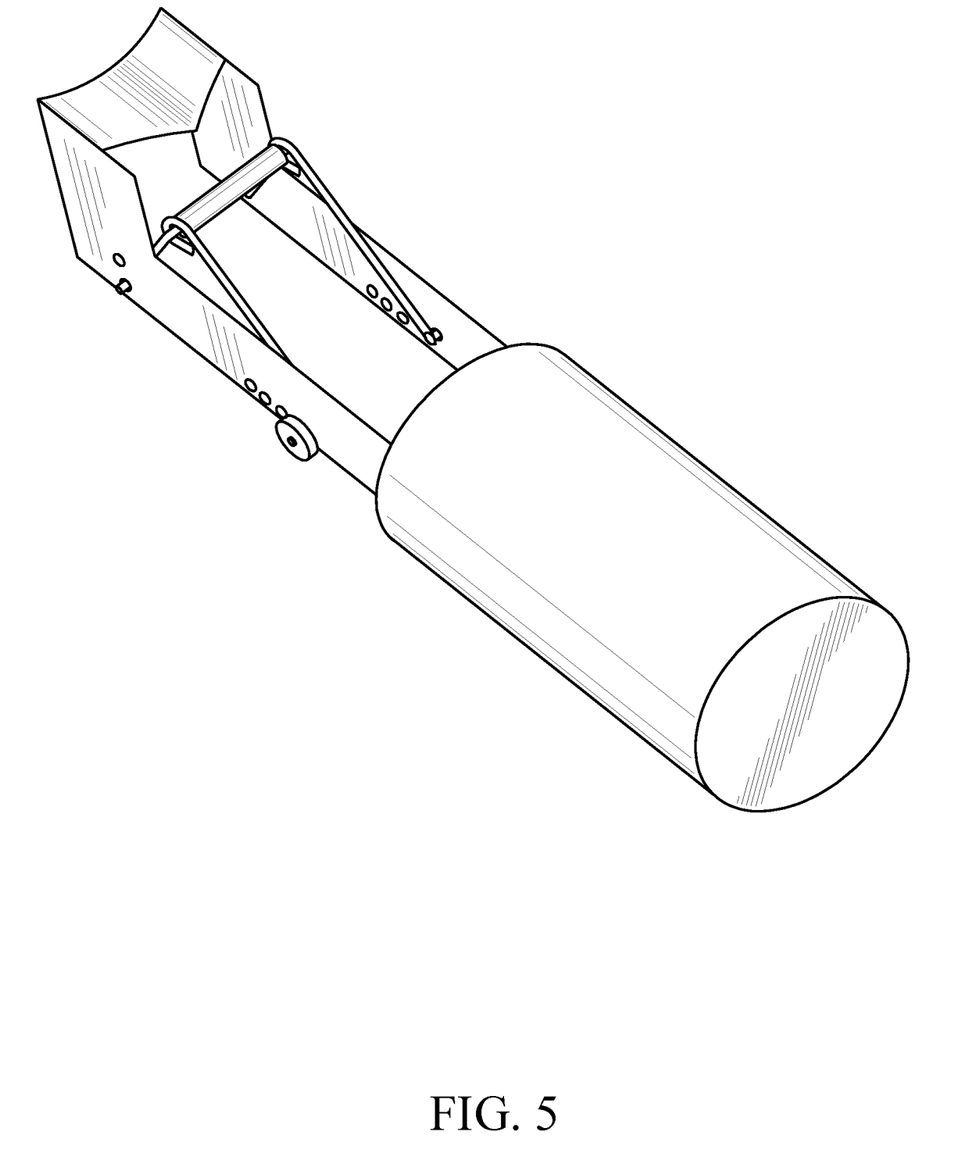
FIG. 5 shows a bottom perspective view of the fruit and vegetable peeler and carving tool (100).

FIG. 5 shows a bottom perspective view of the fruit and vegetable peeler and carving tool.

As shown in FIG. 5, the fruit and vegetable peeler and carving tool has a concave lower side. In some embodiments, the handle may have a larger diameter than the wide formed by the first side extension (135A) and the second side extension (135B). Although shown cylindrical, the handle may have any shape suitable for use as a handle.

Figure 6A:
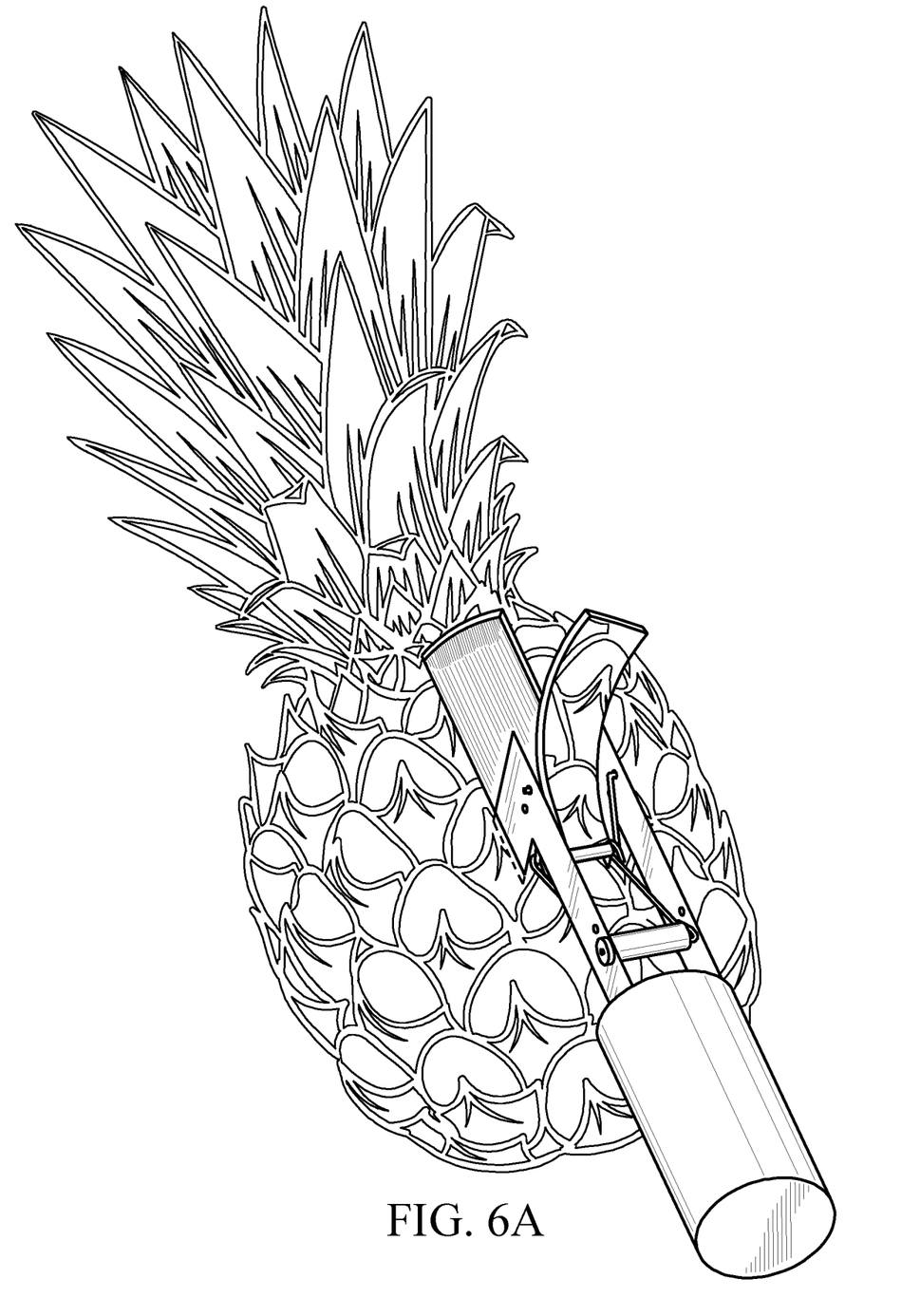
FIG. 6A shows a view of a fruit and vegetable peeler and carving tool (100) used to peel a pineapple.

FIG. 6A shows a view of a fruit and vegetable peeler and carving tool (100) used to peel a pineapple.

Figure 6B:
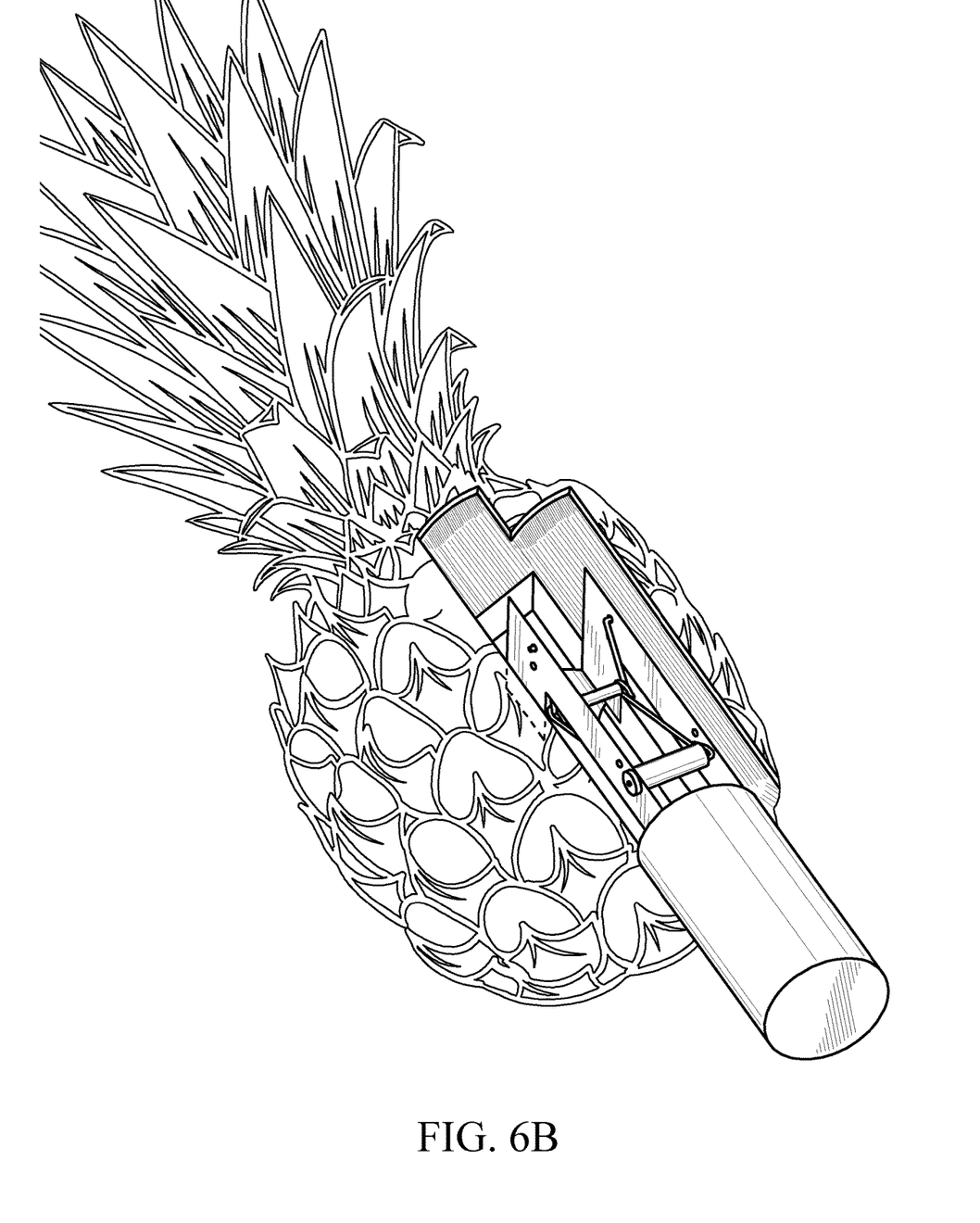
FIG. 6B shows a view of a fruit and vegetable peeler and carving tool (100) used to carve a pineapple after partial peeling.

FIG. 6B shows a view of a fruit and vegetable peeler and carving tool (100) used to carve a pineapple after partial peeling.

As known by many people, pineapples have a thick curved fibrous skin which is actually multiple fruits grown together. To expedite processing, most pineapple processing uses one of two method. One method cuts off the top, bottom, or both, and then cuts cylindrically down the pineapple to remove the thick curved fibrous skin and then laterally cuts circular slices. Another method cuts off the top and bottom and then drives a rotating coring screw into the pineapple to create a circular ribbon which is cut into slices. Both methods, however, waste whatever usable pineapple exists between the cylindrical cut and the thick curved fibrous skin, and neither is suitable for smaller pineapples. A third method is a use of a knife to manually slice skin sections from around the pineapple. Many users still cut straight downwards as attempting to follow the curvature can result in injury or damage.

Conversely, as indicated by FIGS. 6A and 6B, the fruit and vegetable peeler and carving tool (100) may be used first to peel off the thick curved fibrous skin with an appropriate setting of the depth adjustment rod (265), and then, after adjustment of the depth adjustment rod (265), the fruit and vegetable peeler and carving tool (100) is capable of use easily carve the pineapple into appropriate longitudinal slices of desired thickness and length.

Figure 7:
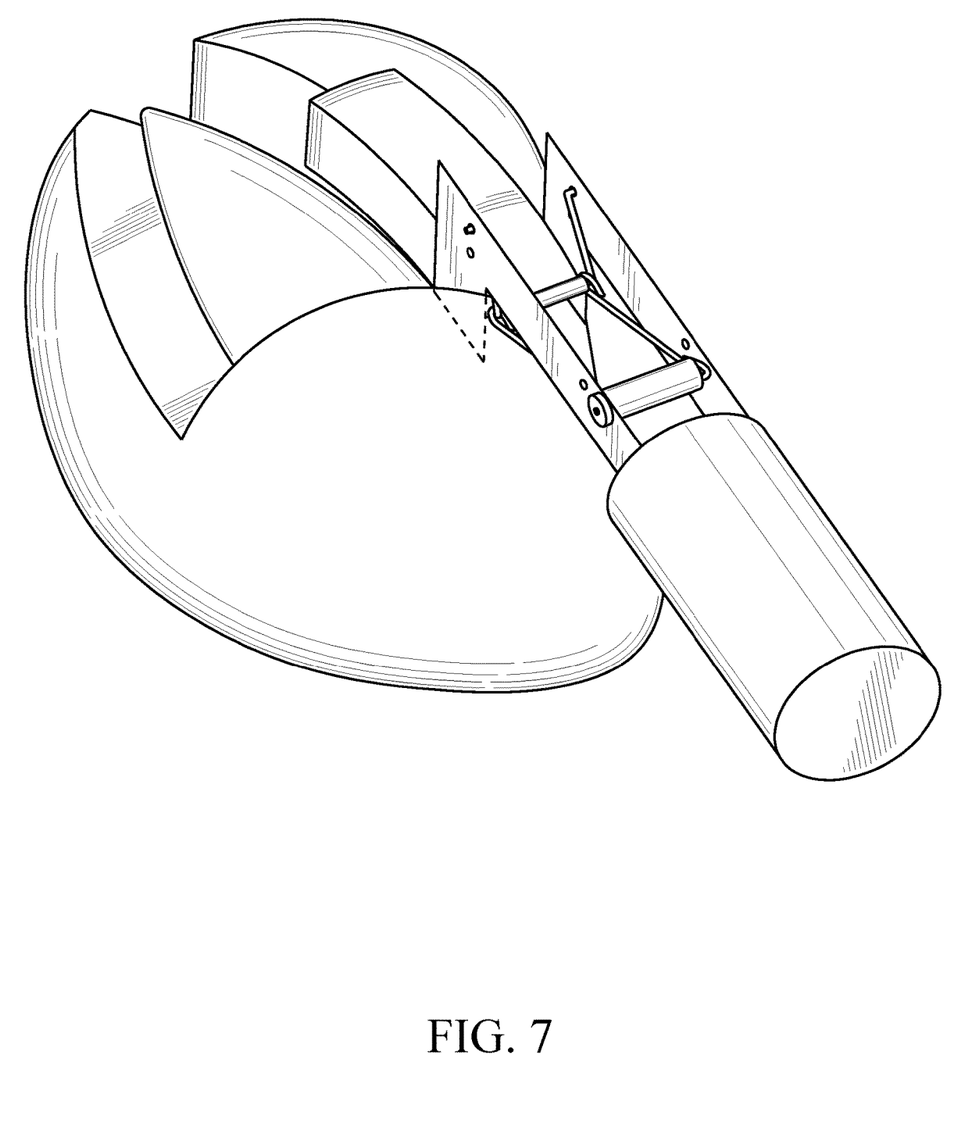
FIG. 7 shows a view of a fruit and vegetable peeler and carving tool (100) used to carve a mango after partial peeling.

FIG. 7 shows a view of a fruit and vegetable peeler and carving tool (100) used to carve a mango after partial peeling.

As shown in FIG. 7, the fruit and vegetable peeler and carving tool (100) is capable of use to easily carve a mango into longitudinal slices from the mango pit.

I claim:

1. A fruit and vegetable peeler and carving tool (100) comprising:
   a handle (105) having a handle top side (110), a handle bottom side (115), a handle front end (120), a handle back end (125), a handle first side (130A), and a handle second side (130B),
   a first side extension (135A) parallel to the handle first side (130A) and having a first side extension top end (140A), a first side extension bottom edge (150A), and a first side extension forward edge (155A) projecting forward from the handle front end (120) in linear alignment with the handle first side (130A),
   a second side extension (135B) parallel to the handle second side (130B) and having a second side extension top end (140B), a second side extension bottom edge (150B), and a second side extension forward edge (155B) projecting forward from the handle front end (120) in linear alignment with the handle second side (130B),
   a first side extension blade (160A) extending from the first side extension (135A) to a midline (185) between the first side extension (135A) and the second side extension (135B) and creating an obtuse angle (A) between the first side extension (135A) and the midline (185) between the first side extension (135A) and the second side extension (135B),
   a second side extension blade (160B) extending from the second side extension to the midline (185) between the first side extension (135A) and the second side extension (135B) and creating an obtuse angle (A) between the second side extension (135B) and the midline (185) between the first side extension (135A) and the second side extension (135B),
   wherein the first side extension blade (160A) and the second side extension blade (160B) converge into a handle-facing fruit and vegetable peeling and carving blade (215) comprising a convex blade upper side (205) and a concave blade lower side (210),
   an adjustable peeling and carving depth setting device (220) for adjustably setting a fruit and vegetable peeling and carving depth (H) for peeling and carving a specific depth (H) of fruit and vegetables, the adjustable peeling and carving depth setting device (220) comprising:
   a forward adjustable lever first side (225A) affixed at an upper end of the forward adjustable lever first side (225A) to a plurality of vertical linear affixment first side (270A) of the first side extension (135A),
   a rear adjustable lever first side (235A) affixed at an upper end of the rear adjustable lever first side (235A) to a plurality of horizontal linear affixment first side (275A) of the first side extension (135A),
   a forward adjustable lever second side (225B) affixed at an upper end of the forward adjustable lever second side (225B) to a plurality of vertical linear affixment second side (270B) of the second side extension (135B),
   a rear adjustable lever second side (235B) affixed at an upper end of the rear adjustable lever second side (235B) to a plurality of horizontal linear affixment second side (275B) of the second side extension (135B),
   wherein the forward adjustable lever first side (225A) is connected at a lower end of the forward adjustable lever first side (225A) to a lower end of the rear adjustable lever first side (235A) at a first side of a depth adjustment rod (265), and the forward adjustable lever second side (225B) is connected at a lower end of the forward adjustable lever second side (225B) to a lower end of the rear adjustable lever second side (235B) at a second side of the depth adjustment rod (265), wherein
   the depth adjustment rod (265) can be vertically adjusted with respect to the handle-facing fruit and vegetable peeling and carving blade (215) as to vertically control the peeling and carving depth (H) of the fruit and vegetable peeler and carving tool (100) in increments of at least one-sixteenth inch.

2. The fruit and vegetable peeler and carving tool (100) of claim 1 wherein the plurality of horizontal linear affixment first side (275A) and the plurality of horizontal linear affixment second side (275B) comprise a discrete plurality of horizontal linear affixment (275).

3. The fruit and vegetable peeler and carving tool (100) of claim 1 wherein the plurality of horizontal linear affixment first side (275A) and the plurality of horizontal linear affixment second side (275B) comprise a continuous plurality of horizontal linear affixment (220B).

4. The fruit and vegetable peeler and carving tool (100) of claim 1 wherein the obtuse angle (A) is greater than 90 degrees but less than 120 degrees.

5. The fruit and vegetable peeler and carving tool (100) of claim 1 wherein the obtuse angle (A) is between 120 degrees and 150 degrees.

6. The fruit and vegetable peeler and carving tool (100) of claim 1 wherein the obtuse angle (A) is greater than 150 degrees.

7. The fruit and vegetable peeler and carving tool (100) of claim 1 wherein the first side extension blade (160A) comprises a trapezoid.

8. The fruit and vegetable peeler and carving tool (100) of claim 1 wherein the second side extension blade (160B) comprises a trapezoid.

9. The fruit and vegetable peeler and carving tool (100) of claim 1 wherein the forward adjustable lever first side (225A) is independently adjustably from the rear adjustable lever first side (235A).

10. The fruit and vegetable peeler and carving tool (100) of claim 1 wherein the forward adjustable lever second side (225B) is independently adjustably from the rear adjustable lever second side (235B).

11. The fruit and vegetable peeler and carving tool (100) of claim 1 wherein the forward adjustable lever first side (225A) is independently adjustably from the forward adjustable lever second side (225B).

12. The fruit and vegetable peeler and carving tool (100) of claim 1 wherein the rear adjustable lever first side (235A) is independently adjustably from the rear adjustable lever second side (235B).

* * * * *